United States Patent [19]

Kagohata

[11] 4,456,166
[45] Jun. 26, 1984

[54] TEMPERATURE CONTROL SYSTEM FOR AIR CONDITIONERS

[75] Inventor: Tsuneo Kagohata, Ibaraki, Japan
[73] Assignee: Hitachi, Ltd., Tokyo, Japan
[21] Appl. No.: 464,946
[22] Filed: Feb. 8, 1983
[30] Foreign Application Priority Data Feb. 8, 1982 [JP] Japan ................................ 57-17552

[51] Int. Cl.³ .................... G05D 23/00; G05B 13/00
[52] U.S. Cl. ..................................... 236/13; 165/43; 236/78 C; 318/561
[58] Field of Search .................. 236/13, 78 C, 49; 165/43, 35; 318/561, 652, 663; 237/12.3 A, 12.3 B

[56] References Cited

U.S. PATENT DOCUMENTS

| | | | |
|---|---|---|---|
| 3,315,730 | 4/1967 | Weaver et al. | 165/23 |
| 4,264,849 | 4/1981 | Fleischer et al. | 318/568 |
| 4,358,936 | 11/1982 | Ito et al. | 165/43 X |
| 4,365,663 | 12/1982 | Inoue et al. | 165/43 X |
| 4,386,397 | 5/1983 | Saeki | 318/561 X |

*Primary Examiner*—William E. Wayner
*Attorney, Agent, or Firm*—Antonelli, Terry & Wands

[57] ABSTRACT

Disclosed is a temperature control system for airconditioners having air blend doors which are controlled by electrical signals related to the room temperature such that the amount of cool air to be reheated by a heater and the amount of cool air bypassing the heater have an appropriate proportion so as to achieve a desired room temperature, and a sensor which provides an electrical signal representing the degree of opening of the air blend door. The degree of opening of the air blend door is recognized with reference to the electrical signal from the sensor corresponding to the full-closed position or full-open position of the air blend door. The system has a function of zero-adjusting the sensor automatically following the control operation.

6 Claims, 3 Drawing Figures

TEMPERATURE CONTROL SYSTEM FOR AIR CONDITIONERS

BACKGROUND OF THE INVENTION

1. Field of the Invention

The present invention relates to a temperature control system for air conditioners of the type wherein the proportion of the flow of cool air to be reheated by a heater and the flow of cool air bypassing the heater is controlled by adjusting the opening of an air blend door provided at the inport of the heater so that the temperature of air introduced into the room is adjusted.

2. Description of the Prior Art

In the conventional temperature control system for air conditioners of this type, as disclosed in U.S. Pat. No. 3,315,730, the actual opening of the air blend door is detected by a sensor (e.g., potentiometer) and used together with the setup temperature signal and room temperature signal to calculate the targent opening signal for the air blend door.

One way of measuring the actual opening of the air blend door is based on the difference of the sensor signal from the reference signal which is produced by the sensor when the air blend door is mechanically fully closed (minimum opening) or fully open (maximum opening). In this case, accurate correspondence must have been made between the sensor reference signal and the mechanically full-closed position or full-open position (both will be termed generically "zero-position") of the air blend door.

The inventors of the present invention have proposed to make correspondence between the sensor reference signal and the zero-position of the air blend door by the adjustment of the sensor mount position in the assembling process of the air conditioner such that the sensor provides an output corresponding to the minimum opening position (or maximum opening position) when the air blend door is set to the full-closed position or full-open position. This manual adjustment for the zero-position of the sensor takes a considerable time, and it has been the major reason why the assembling time for the air conditioner cannot be reduced. In addition, during the assembly of the sensor to the zero-position determined by adjustment, the sensor could be moved by an external force, causing the opening of the air blend door to be detected in accordance with an erroneous reference signal, thus resulting in the temperature control based on an erroneous opening signal of the air blend door.

SUMMARY OF THE INVENTION

One object of the present invention is to provide a temperature control system for air conditioners wherein the zero-position of the sensor for detecting the opening of the air blend door is adjusted automatically by the air conditioner itself after the sensor has been fixed.

Another object of the present invention is to provide a temperature control system for air conditioners wherein the zero-position of the sensor for detecting the opening of the air blend door is adjusted automatically during the normal temperature control operation.

Still another object of the present invention is to provide a temperature control system for air conditioners wherein the system has a self-recovering ability against an abnormal response of the sensor caused by a disturbance.

According to one characteristic aspect of the present invention, the system is provided with a means for detecting the zero-position of the air blend door and a memory means which stores the sensor output value as the reference value corresponding to the zero-position of the air blend door when the detection means determines that the air blend door has reached the zero-position.

According to further characteristic aspect of the present invention, the system is provided with a means for setting a predetermined initial value for the sensor reference signal corresponding to the zero-position of the air blend door to the memory means when the system starts operating, a means for detecting that the air blend door controlled in accordance with the initial value has reached the zero-position, and a means for replacing the reference value stored in the memory means with the output of the sensor as a true reference value when the detection means detects the zero-position of the air blend door.

According to still another characteristic aspect of the present invention, the system is provided with a means for detecting the zero-position of the air blend door, a means for measuring the difference between the minimum opening position and maximum opening position of the air blend door basing on the output of the sensor when the detection means detects that the air blend door has reached the zero-position, a means determining the sensor output as an abnormal signal when the measuring means produces a certain difference of output from a predetermined value, and a memory means for storing the sensor output as the sensor reference signal corresponding to the zero-position of the air blend door except for the case when the determination means determines the sensor output to be abnormal.

DESCRIPTION OF THE PREFERRED EMBODIMENT

The invention will now be described in detail for an embodiment where the inventive temperature control system is applied to an automobile air conditioner.

Figure 1:
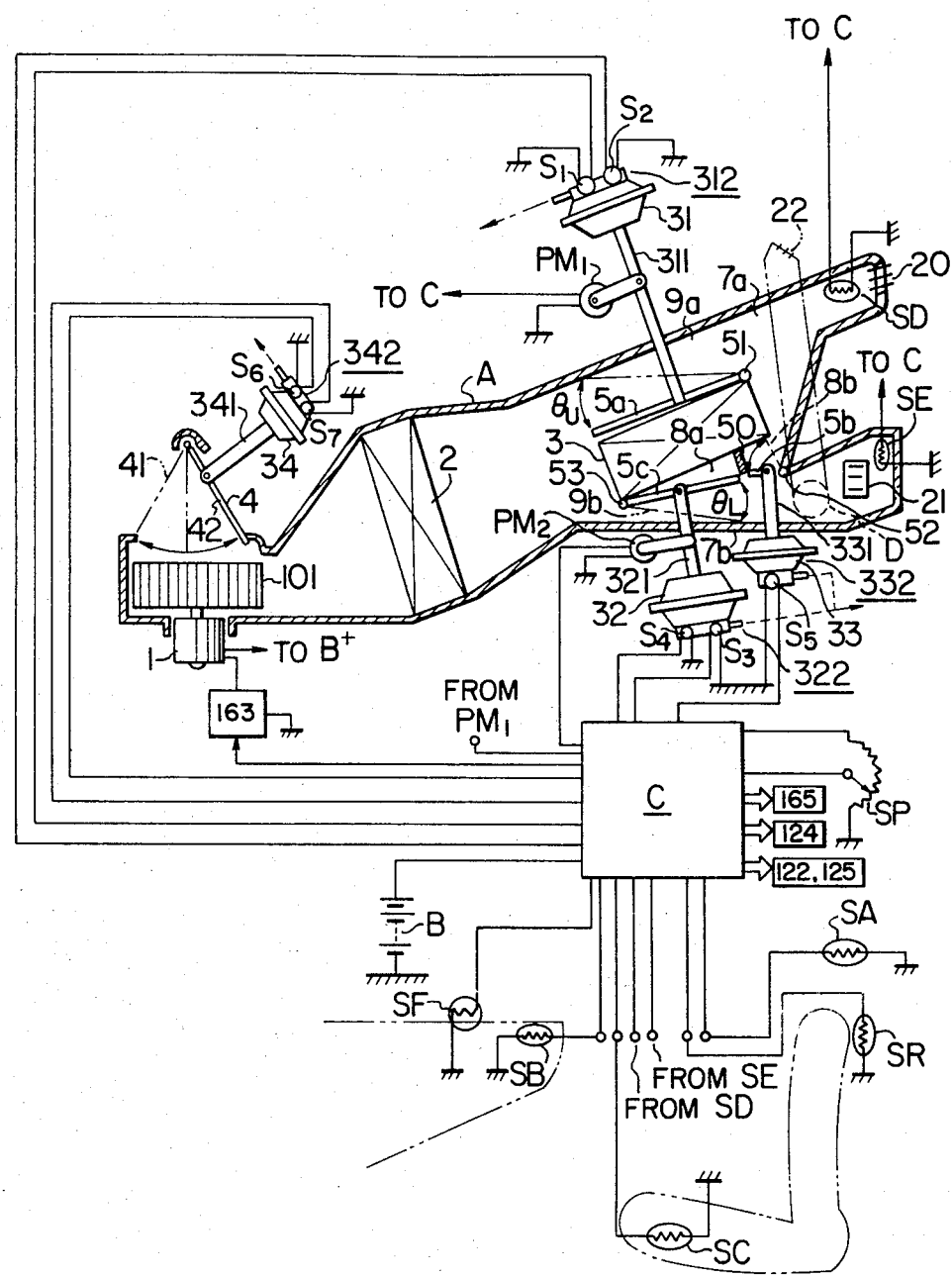
FIG. 1 is a systematic diagram showing the air conditioner with the present invention applied thereto.

In FIG. 1, reference number 1 denotes a blower motor, 101 is a blower fan fixed to the motor, 4 is a door for introducing the interior or exterior air flow selectively, and 41 and 42 are interior air intake port communicating with the passenger compartment and exterior air intake port communicating with the outside of the passenger compartment, respectively, formed in duct A.

A heater 3 is disposed so that its inflow and out-flow surfaces confront the interior surface of the duct A. A space between the inflow surface and the duct interior surface forms a main cool air path 9a, and a space between the out-flow surface and the duct interior surface forms a subsidiary cool air path 9b.

First air blend door 5a has a shaft 51 located at the corner of the heater core 3 on the delivery side of the main cool air path 9a so that the door turns in the range between the in-flow surface of the heater core 3 and the interior wall of the duct A.

Second air blend door 5c has a shaft 53 located at the corner of the heater core 3 on the intake side of the subsidiary cool air path 9b so that the door turns in the range between the out-flow surface of the heater core 3 and the interior wall of the duct. In such an arrangement of two air blend dampers, the air flow in each air path can be controlled by provision of a small angular range between the full-closed position and the full-open position of each air blend door, and the air conditioner can be made compact.

50 is a separation wall provided on the out-flow surface side of the heater core 3, dividing the output warm air flow into a main warm air path 8a and a subsidiary warm air path 8b.

Control door 5b as a shaft 52 supported on the duct at the delivery port of the subsidiary warm air path 8b so that the tip of the door can turn in the range between the end of the separation wall 50 and the corner of the heater core 3 confronting the subsidiary warm air path 8b.

D denotes a branch port to the defroster, communicating with the warm air duct 7b, and there is provided a delivery port selecting door (not shown) at the branch port for selecting the delivery of warm air to a defroster port 22 or to a lower delivery port 21.

31 is an actuator for operating the first air blend door 5, consisting of a vacuum-operated diaphragm (not shown), a rod 311 with its one end connected to the diaphragm, and a vacuum control valve 312 which controls the negative pressure applied to the diaphragm.

32 is an actuator for operating the second air blend door 5c, consisting of a diaphragm chamber (not shown) separated by a diaphragm, a rod 321 fixed to the diaphragm, and a vacuum control valve 322 which controls the negative pressure applied to the diaphragm.

The vacuum control valves 312 and 322 have electromagnetic valves S1 and S3, respectively, for selecting the atmospheric pressure or a negative pressure to be applied to the diaphragm chamber. When the electromagnetic valves S1 and S3 are activated, a negative pressure is applied to the diaphragm chamber, causing the doors 5a and 5c to be pulled through the rods 311 and 321 toward the respective actuators.

When the electromagnetic valves S1 and S3 are disactivated, the negative pressure which has been applied to the diaphragm chamber is released to the atmosphere, causing a spring, which resides within the actuator and has been contracted by the vacuum-operated diaphragm, to expand, and the doors 5a and 5c are pushed through the rods 311 and 321 back to the side of the heater core 3.

By operating electromagnetic valves S2 and S4 so as to close both of the atmospheric and vacuum air paths to the diaphragm chamber when the doors 5a and 5c have come to the predetermined position, the diaphragm chamber maintains a constant pressure, causing the doors 5a and 5c to be locked at that position.

33 is an actuator for operating the control door 5b, consisting of a diaphragm (not shown), a rod 331 fixed to the diaphragm, and a vacuum control valve 332 which controls the negative pressure applied to the diaphragm.

The vacuum control valve 332 has an electromagnetic valve S5.

Figure 2:
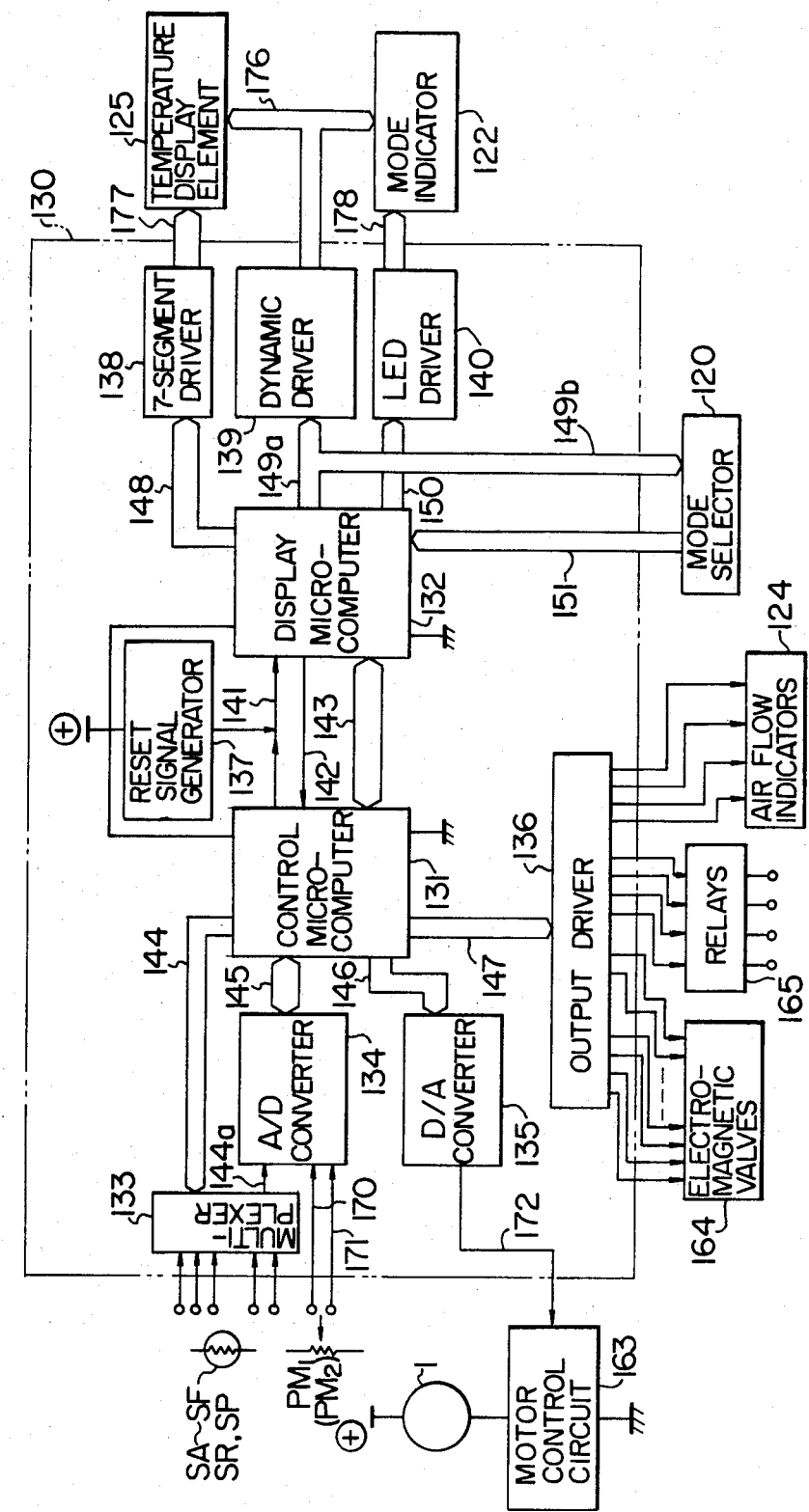
FIG. 2 is a block diagram showing the control circuit for the air conditioner shown in FIG. 1.

With the electromagnetic valve S5 being disactivated, the diaphragm is pressed in the upward direction on FIG. 2 by a spring (not shown), causing the door 5b to be moved through the rod 331 to the position shown by the dashed line.

When the electromagnetic valve S5 is energized by the power source, the diaphragm is pulled downward on FIG. 2 by a negative pressure applied thereto, causing the door 5b to be moved through the rod 331 to the position shown by the solid line.

34 is an actuator for operating the interior-air/exterior-air selection door, consisting of a diaphragm (not shown), a rod 341 fixed to the diaphragm, and a vacuum control valve 342 which controls the negative pressure applied to the diaphragm.

The vacuum control valve 342 has electromagnetic valves S6 and S7. The diaphragm is made up of two diaphragms spaced out from each other and disposed in the axial direction of the rod 341.

With the electromagnetic valves S6 and S7 being disactivated, both diaphragms are pushed leftward on the drawing, causing the door 4 to be moved through the rod 341 to the position shown by the dashed line.

When the electromagnetic valve S6 is energized, one of the diaphragms is subjected to a negative pressure and pulled rightward on the drawing while contracting the associated spring, and the door 4 is drawn by the rod 341 to the position shown by the dot-and-dash line.

When the electromagnetic valve S7 is also energized, both diaphragms are further pulled rightward on the drawing while contracting another spring, and the door 4 is moved to the position shown by the solid line.

The above-mentioned electromagnetic valves S1 through S7 are controlled by control circuit C including microcomputers.

SP denotes a rheostat operated by the passenger for adjusting the setup temperature $T_S$.

The target interior temperature $T_{SO}$ is calculated basing on the setup temperature $T_S$, the atmospheric temperature $T_A$ measured by ambient thermal sensor SA, and the quantity of sunshine Q measured by sunshine sensor SF, in accordance with the following equation programmed in ROM of the microcomputer.

$$T_{SO} = T_S - \alpha(T_A - 25) - (2/660)Q \tag{1}$$

where the target temperature $T_{SO}$ and atmospheric temperature $T_A$ read in °C., $\alpha$ takes a value of 1/5 for an atmospheric temperature $T_A$ of 25° C. or higher or a value of 1/15 for a $T_A$ below 25° C., and the quantity of sunshine Q (kcal/h) is evaluated in terms of the difference between the temperature $T_Q$ measured by the sunshine sensor SF and the temperature $T_R$ measured by the interior thermal sensor $S_R$ multiplied by a coefficient of 20 kcal/h.

The target warm air temperature $Td_{LO}$ in the warm air duct 7b is calculated by the following equations basing on the target temperature $T_{SO}$, the atmospheric temperature $T_A$, the low-position temperature $T_L$ measured by interior thermal sensor $S_C$ located at a lower position in the passenger compartment, and the temperature $Td_L$ measured by thermal sensor SE located in the warm air duct 7b.

$$T_{SOL} = T_{SO} + \frac{70 - T_a}{18} \tag{2}$$

where $T_{SOL}$ is the target low-position temperature.

$$\Delta T_L = T_{SOL} - T_L \tag{3}$$

$$Td_{LO} = 6\left(\Delta T_L + \frac{1}{680}\int \Delta T_L dt\right) + 30 \quad (4)$$

where $Td_{LO}$ is set to 0° C. when it is equal to or below 0° C. and $Td_{LO}$ is set to 60° C. when it is equal to or above 60° C.

The target opening $\theta_L$ of the second air blend door $5c$ to achieve the target warm air temperature $Td_{LO}$ is calculated by the following equations.

$$\Delta Td_{LO} = Td_{LO} - Td_L \quad (5)$$

$$\theta_L = 3 \times \Delta Td_{LO} + 15 \quad (6)$$

where $\theta_L$ is set to 0° C. when it is equal to or below 0° C., and $\theta_L$ is set to 30° C. when it is equal to or above 30° C. In defroster mode, $\theta_L$ is set to 30° C.

The degree of opening of the door $5c$ reads with respect to the zero-degree position shown by the solid line in the figure.

The current opening of the door $5c$ is detected by potentiometer PM2, which is compared with the target opening $\theta_L$ so as to determine which direction the door should be moved. Then whether or not the electromagnetic valve S3 is energized is determined accordingly.

For example, if it is determined that the door located as shown by the dashed line needs to have much smaller opening, the electromagnetic valve S3 is first deenergized, and then the valve S4 is deenergized.

Consequently, a negative pressure applied to the diaphragm is released to the atmosphere, and the door $5c$ moves toward the heater core. The opening of the door $5c$ is measured continuously by the potentiometer PM2 and stored in a rewritable memory (RAM). The current opening stored in the RAM is compared with the target opening periodically, and when both values coincide with each other, the electromagnetic valve S4 is energized so that the door $5c$ is locked to that position.

On the other hand, if it is determined that the door in the present position needs to have a larger opening, the electromagnetic valve S3 is first energized, and then the valve S4 is energized. Consequently, a negative pressure is applied to the diaphragm and the door $5c$ is pulled toward the actuator.

When the door $5c$ has reached the target opening, the electromagnetic valve S4 is energized while the valve S3 is deenergized, and the door $5c$ is locked to that position.

The target cool air temperature $Td_{LO}$ in the cool air duct $7a$ is calculated by the following equations using the target temperature $T_{SO}$, the atmospheric temperature $T_A$, the high-position temperature $T_U$ measured by thermal sensor $S_B$ located at the top of the passenger compartment, and the cool air temperature $Td_U$ measured by thermal sensor SD located in the cool air duct $7a$.

$$T_{SOU} = T_{SO} + \frac{T_a - 70}{18} \quad (7)$$

where $T_{SOU}$ is the target high-position temperature.

$$\Delta T_U = T_{SOU} - T_U \quad (8)$$

$$Td_{UO} = 3\left(4T_U + \frac{1}{680}\int \Delta T_U dt\right) + 15 \quad (9)$$

where $Td_{UO}$ is set to 0° C. when it is equal to or below 0° C., and $Td_{UO}$ is set to 30° C. when it is equal to or above 30° C.

Subsequently, the target opening $\theta_U$ of the first air blend door $5a$ to achieve the target cool air temperature $Td_{UO}$ is calculated by the following equations.

$$\Delta Td_{UO} = Td_{UO} - Td_U \quad (10)$$

$$\theta_U = 3 \times \Delta Td_{UO} + 15 \quad (11)$$

where $\theta_U$ is set to 0° C. when it is equal to or below 0° C., and $\theta_U$ is set to 30° C. when it is equal to or above 30° C. In defroster mode, $\theta_U$ is set to 30° C.

The opening of the door $5a$ reads with respect to the zero-position as shown by the solid line in the figure. By measuring the opening of the door $5a$ by potentiometer PM1 and comparing it with the target opening $\theta_U$, it is determined in which direction the door $5a$ needs to move from the current position. Then whether or not the electromagnetic valve S1 is energized is determined accordingly.

For example, if it is determined that the door located in a position shown by the dashed line needs to have a smaller opening, the valve S1 is first deenergized, and then the valve S2 is deenergized.

Consequently, a negative pressure applied to the diaphragm is released to the atmosphere, and the door $5a$ is moved toward the heater core. The opening of the door $5a$ is measured continuously by the potentiometer PM1 and stored in the rewritable memory (RAM) in the microcomputer.

The current opening stored in the RAM is compared with the target opening, and when both values coincide with each other, the microcomputer directs the control circuit C to provide an output for activating the valve S2. When the valve S2 is energized, the door $5a$ is locked to that position.

Accordingly, the temperatures of cool air blowing out of the cool air out-port 20 located at a high-position and warm air blowing out of the warm air out-port 21 located at the floor are controlled appropriately in accordance with the setup temperature (target interior temperature).

If the target opening $\theta_L$ of the second air blend door $5c$ stored in the RAM of the microcomputer becomes equal to or larger than 25 degrees, or if the air conditioner is switched to the defroster mode, the microcomputer directs the control circuit C to disactivate the valve S5. Then the control door $5b$ is moved to the position shown by the dashed line, and the entire warm air out-flow surface of the heater core is exposed to the warm air duct $7b$.

When the detected interior temperature TR, the target interior temperature $T_{SO}$ and the target opening $\theta_U$ of the first air blend door $5a$ stored in the RAM of the microcomputer satisfy the following conditions, the microcomputer directs the control circuit C to activate the valves S6 and S7 so that the door 4 is switched to introduce the interior air.

$$T_R < T_{SO} \text{ and } \theta_U = 0° \quad (12)$$

When the above-mentioned parameters satisfy the following conditions, the microcomputer directs the control circuit C to activate the valve S6 and disactivate the valve S7 so that the door 4 is switched to the intermediate position so as to introduce interior and exterior air evenly.

(a) $T_R < T_{SO}$ and $\theta_U = 0°$     (13)

(b) $\theta_U \neq 0°$ and $T_{SO} < T_R$     (14)

Furthermore, when the parameters satisfy the following conditions, the microcomputer directs the control circuit C to disactivate the valves S6 and S7 so that the door 4 is switched to introduce exterior air.

(a) $\theta_U \neq 0°$ and $T_{SO} > T_R$     (15)

(b) The compressor is halted.

(c) The air conditioner operates in defroster mode.

Furthermore, the microcomputer directs the control circuit C to control the voltage applied to the blower motor 1 in accordance with the convention listed in Table 1 thereby to control the amount of air flow or turn off the blower.

TABLE 1

| Operating condition | Motor voltage |
|---|---|
| (1) $(T_R - T_{SO}) \leq -5°$ C. | 10 V |
| (2) $-5°$ C. $\leq (T_R - T_{SO}) \leq -2°$ C. | $(T_{SO} - T_R) \times 2$ V |
| (3) $-2°$ C. $\leq (T_R - T_{SO}) \leq 5/3°$ C. | 4 V |
| (4) $5/3°$ C. $\leq (T_R - T_{SO}) \leq 5°$ C. | $(T_R - T_{SO}) \times 12/5$ V |
| (5) $5°$ C. $\leq (T_R - T_{SO})$ | 12 V |
| (6) $10 \pm 2$ sec. from startup | A ramp voltage rising gradually from 4 V to 12 V |
| (7) Engine coolant temperature equal to or below 35° C. and $T_R$ lower than $T_{SO}$ | 0 V |
| (8) Defroster mode | 12 V |
| (9) 5 minutes after startup | A ramp voltage falling from 12 V to 8 V. |

In addition, the microcomputer directs the control circuit C to control the operation of the compressor of the cooler in accordance with the convention listed in Table 2.

TABLE 2

| | Operating condition | State of compressor |
|---|---|---|
| (1) | $(T_{SO} - T_A) > 15°$ C. and $(T_S - T_R) > 0$ | Halt |
| (2) | $T_A < 5°$ C. | Halt |
| (3) | Blower motor halts | Halt |
| (4) | Duration of 20 seconds after the motor has stopped. | Restart and stop |

In addition, the microcomputer directs the control circuit C to control the coolant valve in accordance with the convention listed in Table 3.

TABLE 3

| | Operating condition | State of valve |
|---|---|---|
| (1) | Engine coolant temperature equal to or above 35° C., and satisfaction of the conditions: $T_R > T_{SO}$ $T_A > T_S$ $\theta_L \neq 0°$ | Open |

TABLE 3-continued

| | Operating condition | State of valve |
|---|---|---|
| (2) | Defroster mode | Closed |

In the foregoing embodiment, the values of opening of the first and second air blend doors are controlled with reference to the target values of opening which are calculated using individual equations programmed in the microcomputer and basing on the setup temperature (target interior temperature $T_{SO}$) and various thermal information.

However, the air conditioner according to the present invention can be controlled using a single operation lever which moves the first and second air blend doors linking with each other so that cool air blowing out of the cool air delivery port and warm air blowing out of the warm air delivery port produce a predetermined difference of temperature.

FIG. 2 shows a particular example of the control circuit C used in the system of FIG. 1.

In the figure, reference number 130 generally shows the control circuit including single-ship microcomputers 131 and 132 each consisting of a CPU, ROM, RAM, I/O ports, timers, counters, etc. 133 is a multiplexer which selectively conducts one of input analog voltage signals from sensors to A/D converter 134 through signal line 144a in accordance with the command sent from the microcomputer 131 through signal bus 144. The A/D converter 134 transforms the analog voltage signals from the multiplexer 133 or analog voltage signals received on signal lines from feedback potentiometers PM1 and PM2 into digital data, and supplies the data to the microcomputer 131 through data bus 145. In this embodiment, an A/D converter having 8-bit outputs is used. 135 is a D/A converter which transforms 4-bit digital signal received on data bus 146 from the microcomputer 131 into discrete analog voltage signals so as to produce the air flow control signal ranging 0.6–4.0 V. This analog voltage signal is delivered through signal line 172 to motor control circuit 163 for motor 1. 136 is a set of output drivers comprising a plurality of power transistors, which amplify the control signals sent from the microcomputer 131 through data bus 147 to a current level enough to drive windings 164 of electromagnetic valves S1–S7 and relays 165 such as magnetic clutch control relays and coolant valve control relays.

137 is a reset signal generating circuit which provides a reset signal for the microcomputer 132 when the system is turned on or when the power voltage falls to an abnormal range. When a reset signal is generated, it is sent through signal line 141 to display microcomputer 132 for initialization. In this case data which needs to be saved for use after the microcomputer is restarted is transferred through data bus 143 to the control microcomputer 131 and stored in it. Subsequently, a reset signal is given to the control microcomputer 131 through signal line 142 so that it is initialized. The signal lines 141 and 142 are also used by the microcomputers 131 and 132 for checking periodically the readiness of data transmission and reception between the two microcomputers.

The display microcomputer 132 receives from the control microcomputer 131 data of the interior temperature $T_R$, setup temperature $T_S$ and atmospheric temperature $T_A$ through the data bus 143. The microcomputer 132 displays these data in 2-digit numeric characters individually using 7-segment display elements on the temperature display panel.

In more detail, each thermal data received by the display microcomputer 132 is sent out through data bus 148 to 7-segment driver 138 so as to control driving transistors corresponding to the display segments.

The display microcomputer 132 provides periodic signals for activating or disactivating a group of transistors for displaying the interior temperature, a group of transistors for displaying the setup temperature, and a group of transistors for displaying the atmospheric temperature in a sequential fashion thereby to achieve "dynamic display". The display microcomputer 132 provides timing signals for dynamic display through data bus 149a and dynamic driver 139 to the temperature display elements.

The timing signals are also delivered through data bus 149b to mode selector 120 made up of a diode matrix. The mode selector 120 monitors three groups of mode setup signals sequentially in synchronism of the display timing, and when the circuit detects a mode change, it is indicated to the display microcomputer 132 through data bus 151.

Mode setup data is supplied periodically from the display microcomputer 132 to the control microcomputer 131 through the data bus 143 so that the actuators are controlled depending on the mode.

The display microcomputer 132 provides a signal indicating a mode selected by the mode selector 120 to LED driver 140 through the data bus 150 so that a driving transistor for an LED corresponding to the mode signal is activated. Consequently, mode indicator 122 performs dynamic display in response to the timing signal provided by the dynamic driver 139.

176 is a data bus for conducting the timing signal from the dynamic driver 139 to the temperature display elements 125 and the mode indicator 122, 177 is a data bus for conducting the segment signals from the 7-segment driver 138 to the temperature display elements 125, and 178 is a data bus for conducting the LED selection signal from the LED driver 140 to the mode indicator 122.

Figure 3:
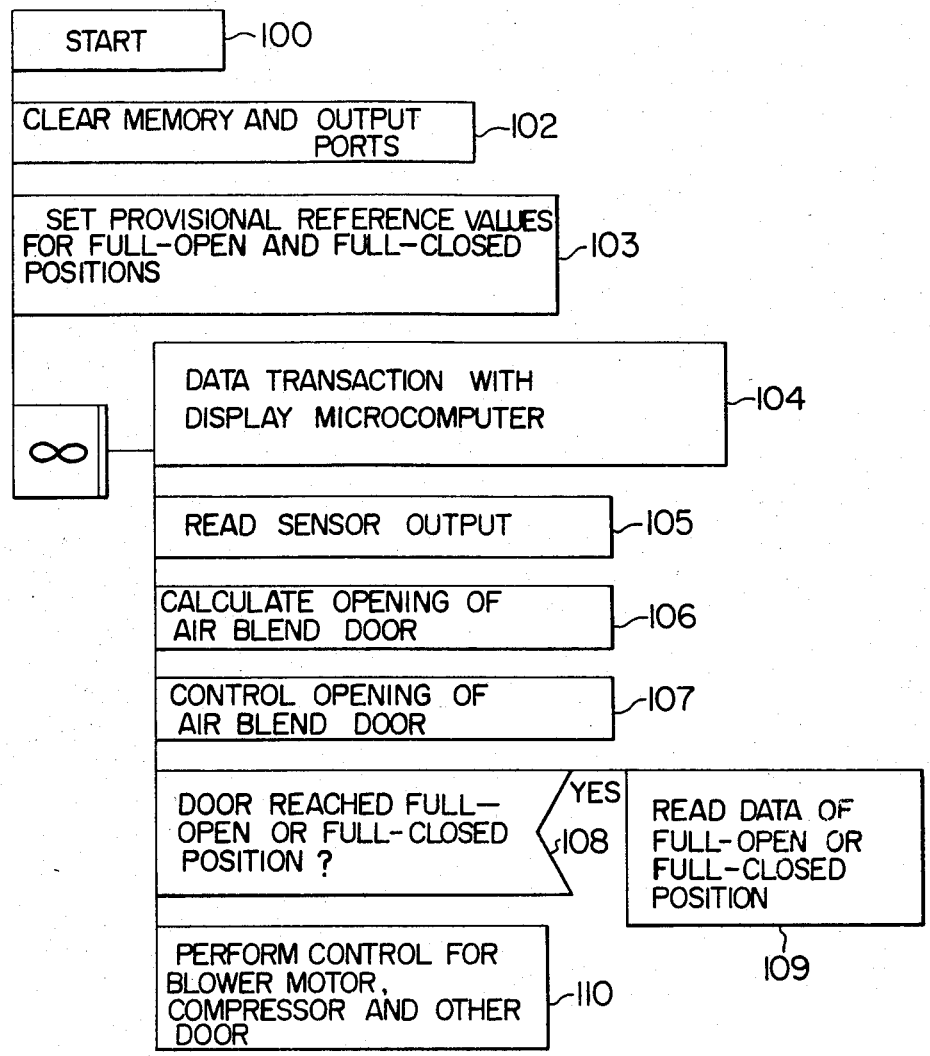
FIG. 3 is a flowchart showing the control operation according to an embodiment of the present invention.

The following will describe the process of control carried out by this embodiment and the process of zero-point adjustment for the sensors of the air blend doors in accordance with FIG. 3.

When the power supply to the control circuit is turned on and the microcomputers 131 and 132 start operating (step 100), the reset signal generating circuit 137 provides a reset signal to clear the memories (RAM) of the microcomputers 131 and 132 and reset the output ports to the initial states (step 102). Provisional reference values PM1min and PM1max for PM1, and PM2min and PM2max for PM2 corresponding to the zero-positions of the air blend doors 5a and 5c, respectively, are set as initial values in the RAM of the control microcomputer 131 (step 103). The system initialization is thus completed, and the system enters the normal control process.

First, the control microcomputer 131 communicates with the display microcomputer 132 for transaction of data (step 104). In step 104, the control microcomputer 131 receives the mode setup data from the display microcomputer 132 and stores the data in the RAM. Then the microcomputer 131 receives thermal data from the sensors $S_A$–$S_F$, $S_P$ and $S_R$ and door opening data from PM1 and PM2, and stores these data in the RAM (step 105).

As shown in FIG. 1, the air blend doors have initial states, $\theta_U = 0°$ for 5a and $\theta_L = 0°$ for 5c. In this case, however, the values of $PM1_0$ and $PM2_0$ at $\theta_U = 0°$ and $\theta_L = 0°$ do not always coincide with PM1min and PM2min which have been set in step 103. Therefore, the values of $PM1_0 = PM1min + \alpha$ and $PM2_0 = PM2min + \beta$ are recognized as actual opening data for the air blend doors 5a and 5c, and stored in the RAM.

The opening for the air blend doors 5a and 5c is calculated basing on thermal data and mode data (step 106).

In the summer season, the interior temperature $T_R$ will be at a high temperature of, for example, 35° C. immediately after the air conditioner has been activated, and even with the target temperature being set as high as 25° C. the difference of the temperatures is 10° C., resulting in a target opening of 0° for $\theta_U$ and $\theta_L$. The values of the sensors for zero target opening are the initial values PM1min and PM2min.

In step 107, the actual opening data $PM1_0$ and $PM2_0$ for the air blend doors 5a and 5c received in step 105 are compared with the target opening data PM1min and PM2min, and signals for disactivating the electromagnetic valves S1, S2, S3 and S4 are issued to move the air blend doors 5a and 5c so that the differences $\alpha$ and $\beta$ between the actual and target opening values are nullified.

At the moment, however, the opening of the air blend doors 5a and 5c located at the mechanical zero-position does not vary even if atmospheric air is introduced into the actuators 31 and 32.

In step 108, the arrival of the air blend doors to the full-closed or full-open position is determined by sensing that the actual opening of the doors 5a and 5c does not vary for a certain duration which is set to approximately 1 second in this embodiment, derived from time needed by the air blend doors 5a and 5c to make a full-stroke movement.

In actual, it seems unlikely that the opening of the doors does not vary for a duration of 1 second or more at a position other than the full-closed or full-open position.

Since the processes from step 104 to step 108 take not longer than 60 ms approximately, the air blend doors 5a and 5c will not be yet determined to reach the full-closed position. Accordingly, the process skips step 109 and go to step 110 in which controls for the blower motor, compressor and interior/exterior air intake door are formed.

These steps are repeated for one second, and if the actual openings of the doors do not vary from $PM1_0$ and $PM2_0$, the process of step 108 determines that the air blend doors are located at the full-closed positions, and replaces the initial values PM1min and PM2min in the RAM with the outputs $PM1_0$ and $PM2_0$ from the potentiometers PM1 and PM2 as reference values for the zero-positions of the air blend doors 5a and 5c. After that, $PM1_0$ and $PM2_0$ are used as reference values for measuring the actual opening of the air blend doors and for other purposes.

For the zero-positions of the air blend doors 5a and 5c, only one of the full-closed position or full-open position needs to be obtained accurately, and it is determined depending on whether the full-closed position or full-open position is used as the reference position for measuring the opening of the air blend doors. Both positions may be used as the reference positions for the cooling and heating operations separately.

In step 108, whether the air blend doors stay at the full-closed position or full-open position can be discriminated referring to whether the target opening is 0° or 30°.

In this embodiment, procedures for detecting the full-closed position or full-open position are incorporated in software of the microcomputer. However, these positions may be detected by using micro-switches which operate at the full-closed position and full-open position of the air blend doors.

Furthermore, it is not limited to use a potentiometer to detect the door position, but it may be replaced with other sensors such as a photoelectronic sensor or magnetic sensor.

In this embodiment, the movement of the air blend doors can possibly be limited temporarily due to insufficient supply pressure or mechanical disturbances. The control system can be more stabilized against disturbances by provision of a step for comparing data of the detected full-closed position and full-open position and rejecting the data if the difference of data for both extreme positions is abnormally smaller than the predetermined value, in addition to the foregoing steps of the embodiment.

According to this embodiment, as described above, the opening control for the air blend doors is carried out with reference to provisional values immediately after power is turned on, and thereafter the reference values are updated by reading positional data each time the doors are controlled to the full-closed position or full-open position. This system eliminates the need for the zero-adjustment for the feedback potentiometers during the assembling process. In addition, because of the opening control for the air blend doors based on ever-new positional data for the full-closed or full-open position, the control characteristics are not varied by aging effects of component parts.

The present invention may be modified as follows.

In step 103 of the above embodiment, the air blend doors are forced to move by the amount of the full stroke deviation independently from the temperature control, and when the deviation does not vary for a predetermined duration the position of the air blend doors is determined to be the full-closed position or full-open position and it is stored in the memory of the microcomputer.

According to this modified embodiment, data of the full-closed or full-open position for the air blends are set up before entering to the normal temperature control, and accurate temperature control can be performed from the beginning.

In the foregoing embodiments, the arrival of the air blend doors to the full-closed or full-open position is determined by checking that the sensor output does not vary for a predetermined duration. However, the present invention is not limited to this scheme. Instead, this function can also be achieved by a cyclic process in which the output of the feedback potentiometer is compared with a predetermined reference value, and when the output exceeds the reference value the door position is determined to be the full-closed or full-open position, then the reference value is replaced with the newly detected value.

Although in the foregoing embodiments the present invention is applied to the temperature control system for automobile air conditioners, the invention is not limited to the use in automobiles, but can be applied to various types of air conditioners.

In summary, according to the first invention, the control system is provided with a sensor means which detects that the air blend door has reached the zero-position and a memory means which stores the sensor output, when the arrival of the air blend door to the zero-position is detected, as a reference value corresponding to the zero-position of the air blend door. This arrangement eliminates the need for the zero-adjustment during the attachment of the sensor, allowing the reduction of work time in assembling the air conditioner.

Moreover, the zero-position of the air blend door does not vary during the assembling process as it used to occur in the conventional system, resulting in an enhanced reliability of zero-position setting and thus in an improved reliability of temperature control.

According to the second invention, a provisional reference value is used for the sensor reference value corresponding to the zero-position of the air blend door at the beginning of the temperature control, and that value is replaced with the actual sensor output produced during the temperature control. This makes the control of the air blend door accurate.

According to the third invention, the system is provided with a means for determining whether or not the sensor reference value is replaced by new data basing on the difference between the reference value corresponding to the maximum opening of the air blend door and the reference value corresponding to the minimum opening of the air blend door. This preserves the accurate temperature control against abnormal outputs of the sensor caused by disturbances.

I claim:

1. A temperature control system for an air conditioner having an air blend door which is controlled by an electrical signal related to a room temperature such that the amount of cool air to be reheated by a heater and the amount of cool air bypassing the heater have an appropriate proportion so as to bring the room temperature to a desired temperature, and a sensor which provides an electrical signal representing the degree of opening of said air blend door, the degree of opening of said air blend door being recognized based on an electrical signal from said sensor corresponding to a full-closed position or full-open position of said air blend door, wherein said temperature control system comprises a detection means which detects the arrival of said air blend door to a zero-position, and a memory means which stores the output signal of said sensor as a reference value corresponding to said zero-position of said air blend door when said detection means determines that said air blend door has reached said zero-position, the degree of opening of said air blend door being recognized based on a value stored in said memory means.

2. A temperature control system according to claim 1, wherein said system further comprises a setting means which sets a predetermined provisional value representing a zero-position of said air blend door to said memory means immediately after power to said temperature control system is turned on, the degree of opening of said air blend door being recognized based on said provisional value until said detection means detects that said air blend door has actually reached said zero-position and said provisional value stored in said memory means is replaced with the output of said sensor at a time of detection.

3. A temperature control system according to claim 1, wherein said system further comprises a means for obtaining the difference between a value corresponding to a minimum opening position of said air blend door and a value corresponding to a maximum opening position of said air blend door basing on the output of said sensor when said detection means detects that said air blend door is located in said zero-position, and a renewal negation means which compares an output value from said defferential means with a predetermined specified value and prevents a stored value in said memory means from being replaced with a new value if said output value is smaller than said specified value.

4. A temperature control system according to claim 2, wherein said system further comprises a means for obtaining the difference between a value corresponding to a minimum opening position of said air blend door and a value corresponding to a maximum opening position of said air blend door basing on the output of said sensor when said detection means detects that said air blend door is located in said zero-position, and a renewal negation means which compares an output value from said differential means with a predetermined specified value and prevents a stored value in said memory means from being replaced with a new value if said output value is smaller than said specified value.

5. A control system for an automobile air conditioner wherein the degree of opening of an air blend door for distributing the air flow is detected electrically and the degree of opening of said air blend door is controlled automatically from a full-open position to a full-closed position, wherein said system is provided with a microcomputer which performs a first step of setting a provisional values corresponding to a full-open position and full-closed position of said air blend door immediately after power is turned on, a second step of controlling the degree of opening of said air blend door using said provisional values set in said first step as reference values of control, and a third step of renewing values for carrying out said second step with data corresponding to a zero-position of said air blend door each time it is detected that said air blend door is controlled to said zero-position.

6. A temperature control system according to claim 5, wherein said third step comprises a function that said reference values are not renewed if the stroke of said air blend door which is equal to the difference between data for said full-open position and data for said full-closed position is smaller than a specified value after data corresponding to said zero-position of said air blend door has been read.

* * * * *